US006308785B1

(12) United States Patent
Rhoden

(10) Patent No.: US 6,308,785 B1
(45) Date of Patent: Oct. 30, 2001

(54) ADJUSTABLE GRADER-SPREADER BAR

(76) Inventor: Rod Earl Rhoden, 10900 Meacham Rd., Bakersfield, CA (US) 93312

( * ) Notice: Subject to any disclaimer, the term of this patent is extended or adjusted under 35 U.S.C. 154(b) by 0 days.

(21) Appl. No.: 09/578,803

(22) Filed: May 24, 2000

(51) Int. Cl.[7] ............................. A01B 35/20; E01C 19/22
(52) U.S. Cl. ..................... 172/393; 172/445.1; 404/118
(58) Field of Search .................................. 172/252, 254, 172/392, 393, 445.1, 737, 738, 744, 684.5, 799.5; 37/266, 268, 271, 272; 404/118, 101, 110, 105

(56) References Cited

U.S. PATENT DOCUMENTS

| | | | |
|---|---|---|---|
| 3,704,752 | * 12/1972 | Piacentino | 172/116 |
| 4,320,988 | 3/1982 | Seal . | |
| 4,630,686 | * 12/1986 | Ausmus, Jr. | 172/393 |
| 5,191,943 | 3/1993 | Minor . | |
| 5,191,944 | * 3/1993 | Thorn | 172/445.1 |
| 5,332,331 | * 7/1994 | Critz et al. | 404/118 X |
| 5,511,625 | * 4/1996 | Mork | 172/445.1 |
| 5,599,135 | 2/1997 | Delaurenti . | |

* cited by examiner

Primary Examiner—Robert E. Pezzuto
(74) Attorney, Agent, or Firm—James M. Duncan

(57) ABSTRACT

An adjustable grader-spreader bar with a three-point hitch has a blade frame assembly comprised of a plurality of blade frames, each blade frame having a blade edge fastened at the bottom. The blade frames are slideably connected so that the blade frames have an adjustable overlap. Actuating devices, such as hydraulic rams, are used to extend or retract the blade frames, so that the width of the of the adjustable grader-spreader bar may either be increased or decreased as required for the particular application. Ground engaging skids are attached to each side of the blade frame assembly. The vertical position of each ground engaging skid may be adjusted to raise or lower each side of the adjustable grader-spreader bar. Actuating devices, such as electrical motors, are used to change the vertical position of the ground engaging skids.

23 Claims, 9 Drawing Sheets

ADJUSTABLE GRADER-SPREADER BAR

BACKGROUND

The present invention generally relates to towable devices which are used to grade ground surfaces or spread various materials over the ground surface where it is desirable to obtain a particular finished grade of ground surface or to blend additives into the soil. Such grater-spreader devices are used for a variety of purposes, such as applying paving materials, grading land for construction, and preparing land for agricultural purposes. More particularly, the present invention relates to a grader-spreader adapted to being towed by a tractor having a three-point hitch, where the blades of the apparatus readily adjust to a desired width. An additional feature of the present invention is that the angle and elevation of the cutting blades with respect to the ground surface are readily adjustable, thus allowing the operator to obtain a particular finished grade or slope.

It has been long known that devices towable by tractor provide an efficient and economical means of grading a ground surface and for applying various materials to the ground surface. While self-propelled grading and spreading machinery may accomplish the same task as towable devices, self-propelled machines are expensive, require substantial maintenance, and are often complicated to operate. Because towable devices are propelled by an all-purpose tractor, the devices are relatively inexpensive, simple to operate, and require less maintenance than self-propelled grading and spreading devices.

It has also been a long recognized need that towable grader-spreaders should be adaptable to provide service in a variety of different working conditions. If a grader-spreader device is used in a large open field to prepare the ground surface for planting crops, the operator may desire to adjust the device to obtain a virtually flat surface. However, if the device is used to spread asphalt on a roadway, it is often desired to obtain a final surface with sufficient slope to allow rain and spilled materials to rapidly drain off of the roadway surface.

The invention described in U.S. Pat. No. 4,320,988, issued to Seal on Mar. 23, 1982, discloses a towable grader-spreader utilizing a plurality of cutting blades adjustable in depth and angular position. The patent discloses a device which utilizes a plurality of cutting blades which can function as grader blades or as a spreader. The blades of the invention are adjustable both in depth and in angular position, where the respective ends of the blades may be positioned at different cutting depths from each other so as to vary the angle of a cut on a surface. The blades of the invention are positioned by a hydraulic ram adjustment mechanism. The cutting blades are mounted between a pair of side runners. The width of the device is fixed because the side runners are fixedly attached to one another.

The grader-spreader of U.S. Pat. No. 5,191,943 issued to Minor et al. on Mar. 9, 1993, discloses a pair of transversely extending blades rigidly mounted between two side members. While the ends of the blades of the grader-spreader in the '943 patent are vertically adjustable, the width of the device is fixed.

SUMMARY OF THE INVENTION

An adjustable grader-spreader is disclosed which may be towed by a tractor or other vehicle adaptable to a three-point hitch, where the operator, from the operator's seat on the tractor, may make various adjustments to the grader-spreader to accommodate the immediate needs presented by the working conditions. Unlike other prior art devices, the width of the grader-spreader may be either increased or decreased, depending upon the requirements of the particular job requirements. The elevation of the blade edges relative to the work surface may also be adjusted. The adjustments are made through hydraulic and/or electric actuating devices which are commonly known to those skilled in the art.

The grader-spreader disclosed herein includes a blade frame assembly which is configured from a plurality of blade frames with a blade edge fastened at the bottom of each blade frame. The blade frames are slideably connected to one another so that the blade frames have an adjustable overlap. Actuators are connected to the blade frames in such a manner that the operator may remotely change the total width of the grader-spreader from the operator's position in the towing vehicle. In one embodiment, ground engaging skids are attached to either side of the blade frame assembly.

In one embodiment of the grader-spreader, a plurality of front stabilizers and rear stabilizers connect adjacent blade frames, providing the means for slideably connecting the adjacent blade frames. One means of sliding adjacent blade frames with reference to one another is by the use of hydraulic actuating rams. In the preferred embodiment, the blade frame assembly is comprised of a left blade frame, a right blade frame, and a center blade frame.

Elevating means may be used for adjusting the vertical positions of the left and right ground engaging skids thereby adjusting the level and angle of the blade edges with respect to the ground surface. One means of raising or lowering the ground engaging skids is by an electrical motor operating a screw jack connected to each ground engaging skid.

In an alternative embodiment, the ground engaging skids may be replaced by wheels on each side of the grader-spreader. The wheels may be independently raised or lowered with respect to the blade frame assembly by the same type of actuating means used to raise or lower the ground engaging skids.

DETAILED DESCRIPTION OF THE EMBODIMENTS

Figure 1:
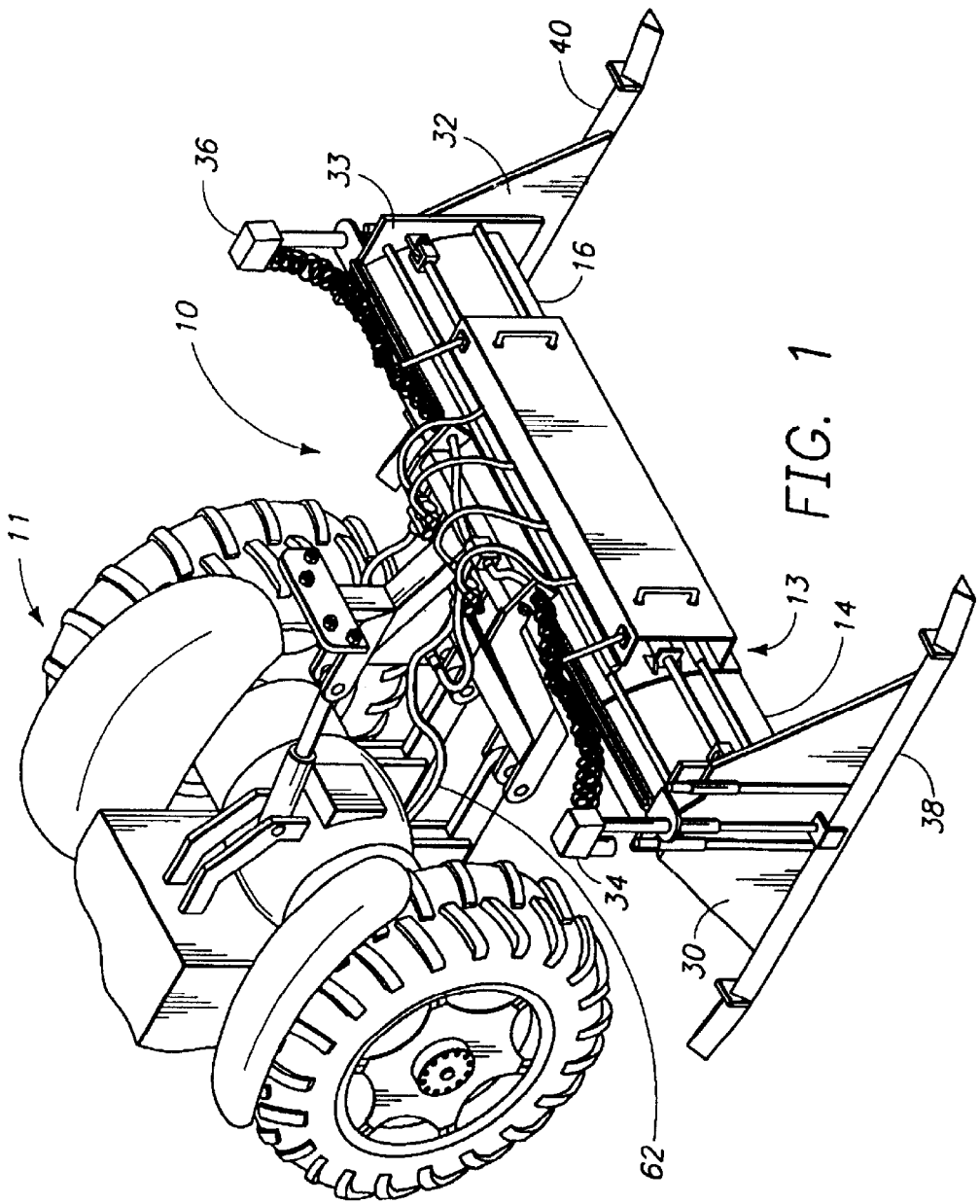
FIG. 1 shows a isometric view of a particular embodiment of the grader-spreader bar illustrating its connection to a tractor with a three-point hitch.

Referring now specifically to the drawings, FIG. 1 shows the adjustable grader-spreader bar 10 attached to a conventional tractor 11 by a three-point hitch assembly 12, by which the grader-spreader bar is supported, towed and lifted for easy transportation. When a particular grading or spreading operation is complete, the tractor operator may lift the entire grader-spreader bar 10 off of the ground surface with the three-point hitch assembly 12 and transports the grader-spreader bar as desired. In the description which follows, the terms left, right, front, and rear are all with respect to the direction of travel of the grader-spreader bar, as it is being towed by the tractor 11. The term outside refers to the side facing away from the center of the grader-spreader bar and the term inside means facing towards the center of the grader-spreader bar.

The grader-spreader bar is generally comprised of a blade frame assembly 13, left ground engaging skid 38, right ground engaging skid 40, and a three-point hitch assembly 12. The blade frame assembly 13 is comprised of a plurality of blade frames, such as the left blade frame 14, the right blade frame 16 and the center blade frame 18 of the preferred embodiment. Fastened to the bottom of each blade frame, are the blade edges, such as the left blade edge 24, right blade edge 26 and the center blade edge 28 respectively attached to the left blade frame 14, the right blade frame 16 and the center blade frame 18 of the preferred embodiment.

The blade frame assembly 13 is assembled so that the left blade frame 14 overlaps the left side of the center blade frame 18 and the right blade frame 16 overlaps the right side of the center blade frame. The blade frame assembly 13 is assembled so as to allow adjustment of the overlap between the various blade frame sections thereby allowing the overall width of the blade frame assembly to be either increased or decreased. Various structural members support and guide the blade frame assembly 13 so as to provide sufficient rigidity for operation, yet also allow the width of the blade frame assembly to be adjusted. Structural members supporting the blade frame assembly 13 include the left front stabilizer 20, the right front stabilizer 22, the upper left rear stabilizer 46, the upper right rear stabilizer 48, the lower left rear stabilizer 50, the lower right rear stabilizer 52, the stabilizer mount 21, the front stabilizer guides 23, and the rear stabilizer guides 47. Additional support is provided by a left guide rail 74 attached to the top of the left blade frame 14, which guide rail glides along the top edge of the left side of the center blade frame 18 as the left blade frame is extended or retracted. Likewise, a right guide rail 76 is attached to the top of the right blade frame 16, which glides along the top edge of the right side of the center blade frame 18 as the right blade frame is extended or retracted.

In the preferred embodiment, the left front stabilizer 20, the right front stabilizer 22, the stabilizer mount 21 and the stabilizer guide 23 are constructed of square or rectangular steel stock. Also in the preferred embodiment, the upper left rear stabilizer 46, the upper right rear stabilizer 48, the lower left rear stabilizer 50, the lower right rear stabilizer 52, and the rear stabilizer guides 47 are constructed of round steel stock. Also in the preferred embodiment, the left guide rail 74 and the right guide rail 76 are constructed of steel angle iron.

Figure 2:
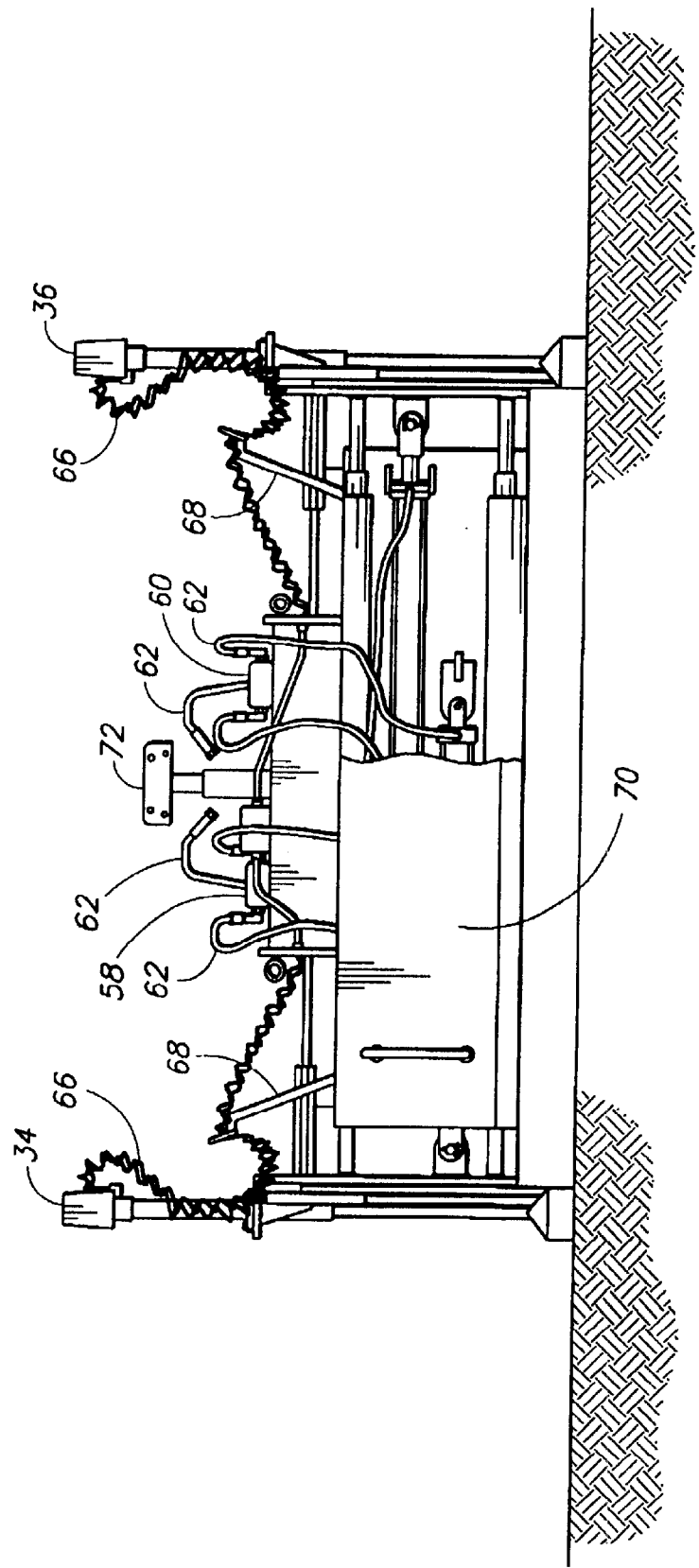
FIG. 2 shows the grader-spreader bar adjusted to its minimum width.
Figure 5:
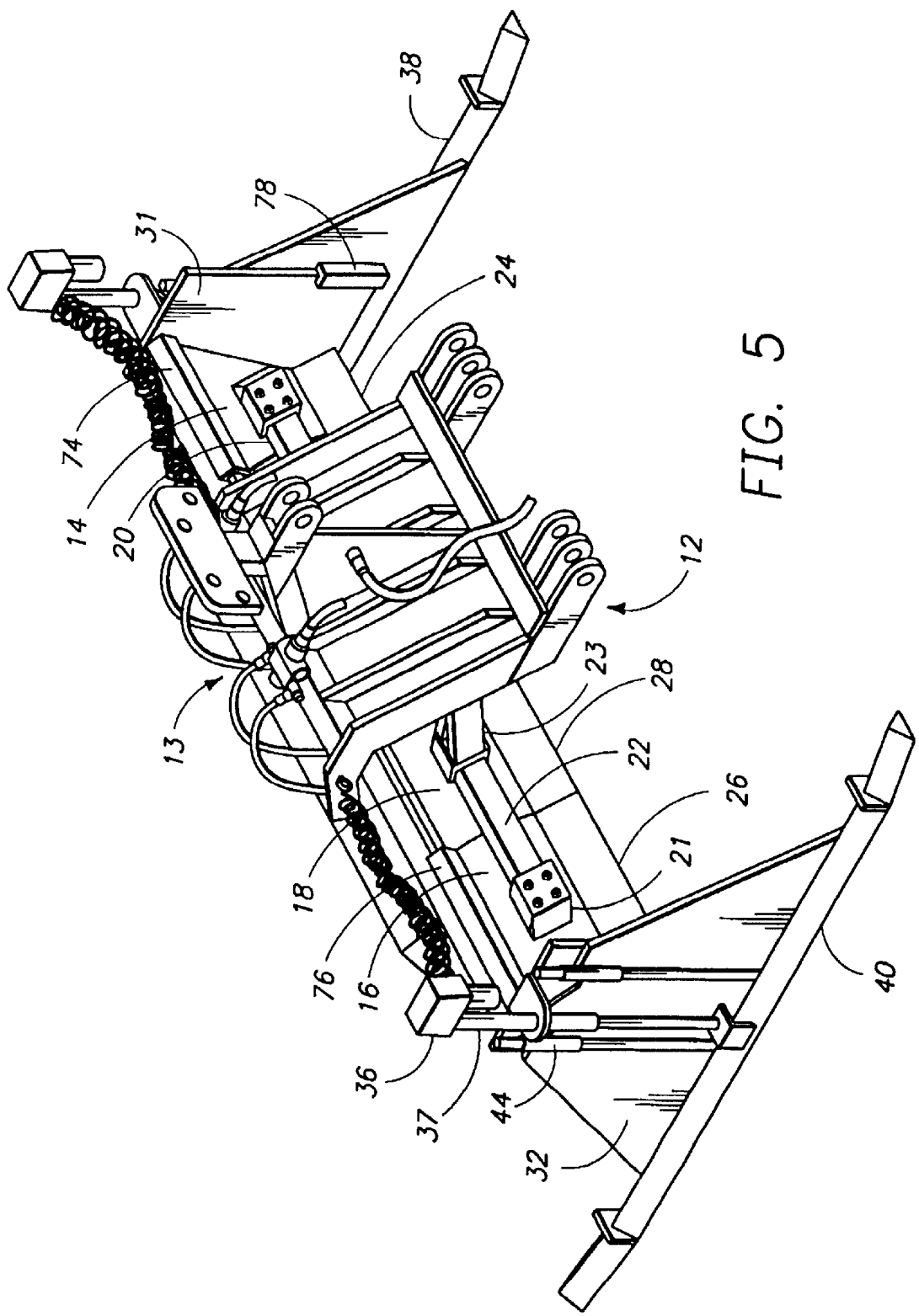
FIG. 5 shows a front view of the grader-spreader bar.
Figure 6:
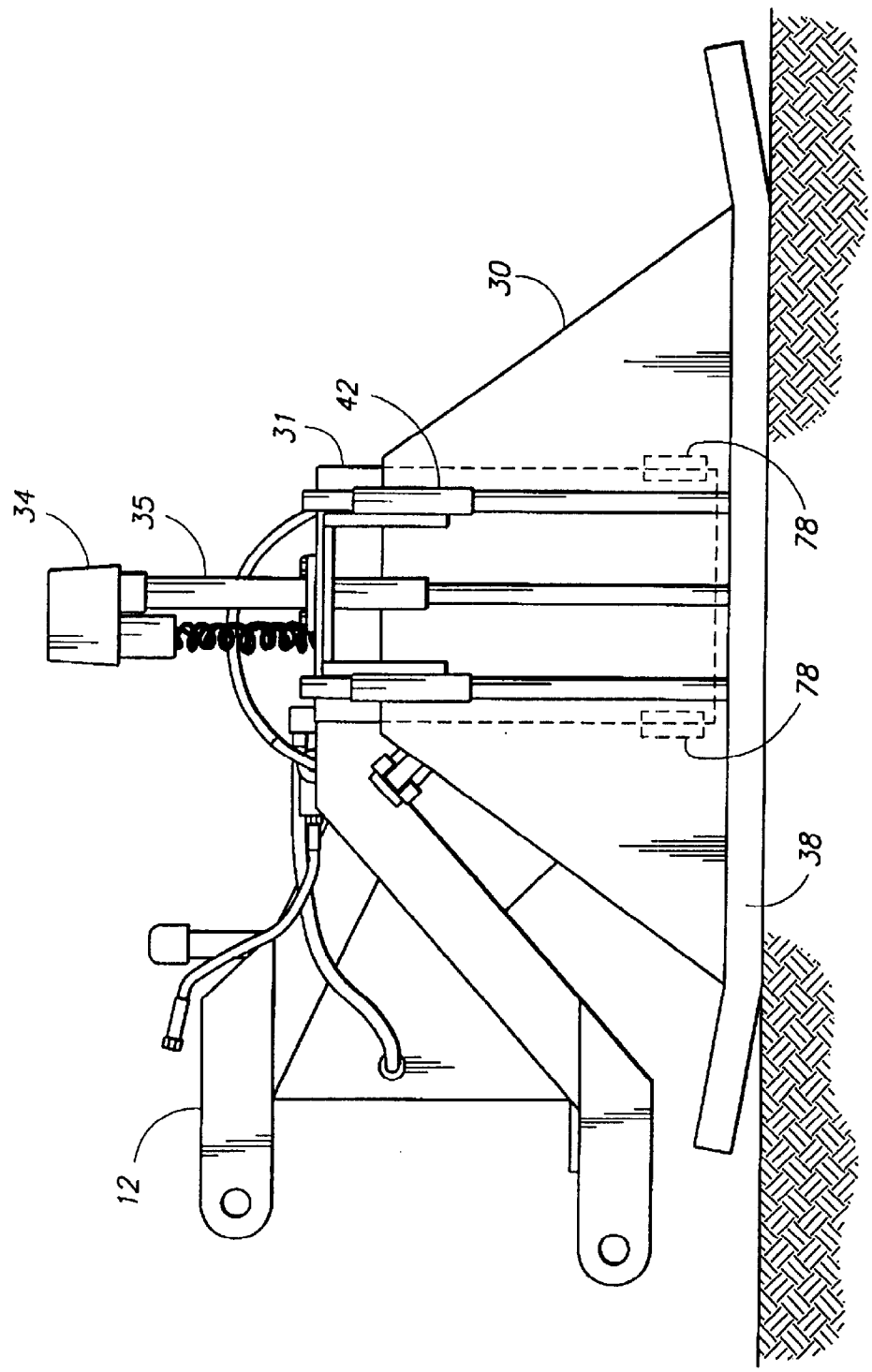
FIG. 6 shows a side view of the left side of the grader-spreader bar.

As depicted in FIG. 5, the outside facing end of the left front stabilizer 20 is connected to a stabilizer mount 21 which is attached to the front facing side of the left blade frame 14. The inside facing end of the the left front stabilizer 20 is inserted through a stabilizer guide 23 attached to the front facing side of the center blade frame 18 so as to allow the stabilizer to slide through the guide as the left blade frame 14 is either retracted to decrease the width of the grader-spreader bar 10, as depicted in FIG. 2, or the left blade frame 14 is extended to increase the width of the grader-spreader bar as depicted in FIG. 3.

Likewise, the outside facing end of the right front stabilizer 22 is connected to a stabilizer mount 21 which is attached to the front facing side of the right blade frame 16. The inside facing end of the right front stabilizer 22 is inserted through the stabilizer guide 23 attached to the front of the center blade frame 18 so as to allow the stabilizer to slide through the guide as the right blade frame 16 is either retracted to decrease the width of the grader-spreader bar 10, as depicted in FIG. 2, or the right blade frame 16 is extended to increase the width of the grader-spreader bar as depicted in FIG. 3.

Figure 3:
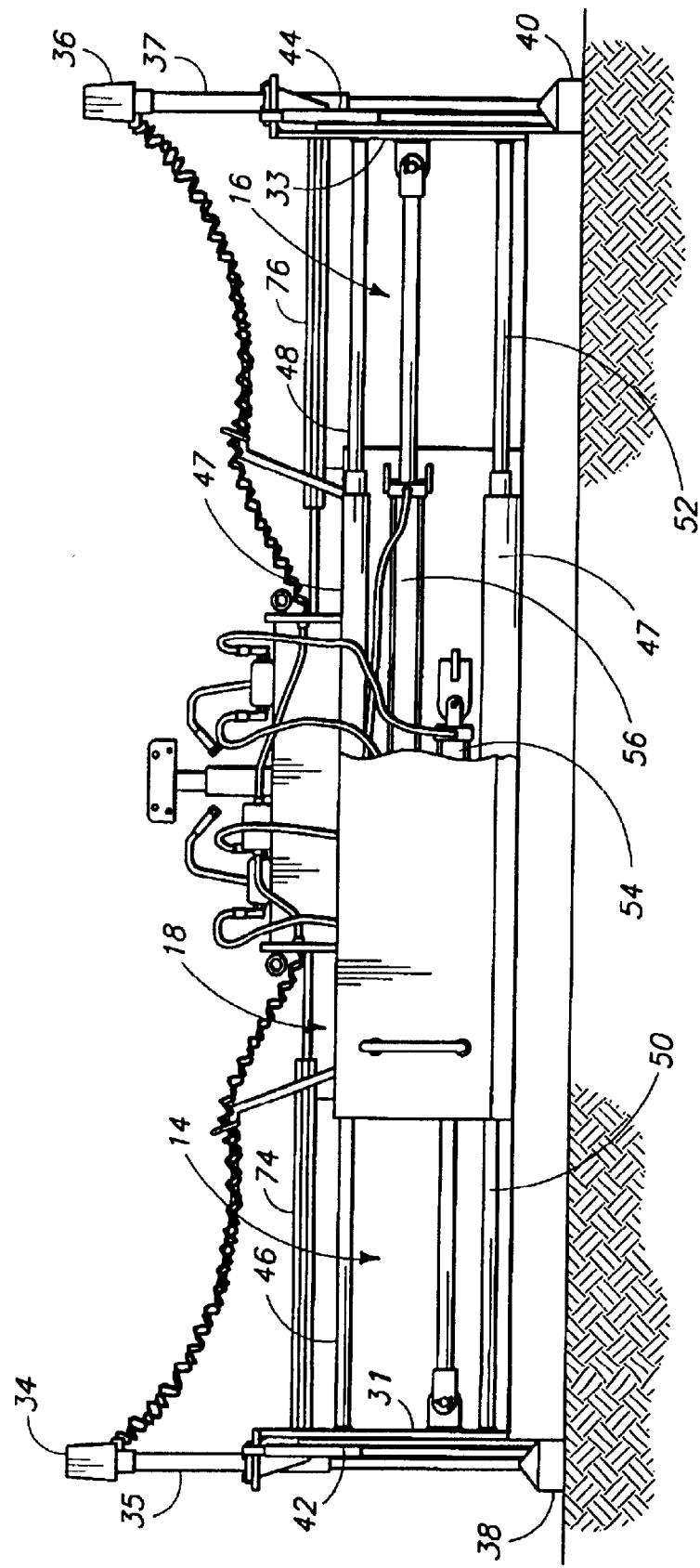
FIG. 3 shows the grader-spreader bar adjusted to its maximum width.
Figure 4:
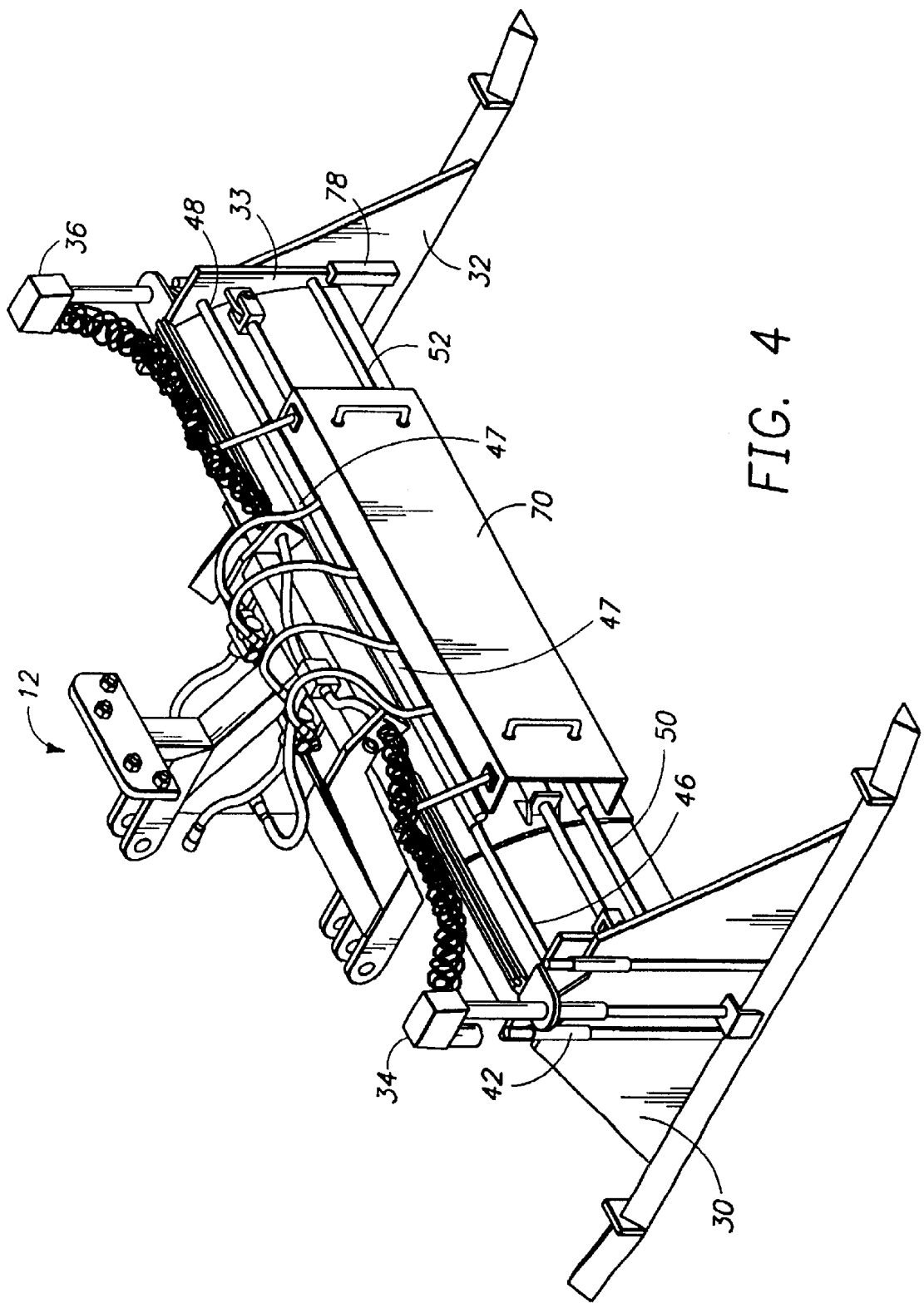
FIG. 4 shows a rear view of the grader-spreader bar.

As depicted in FIG. 3 and FIG. 4, the outside facing end of the upper left rear stabilizer 46 is attached to the upper inside face of the left side support 31. The inside facing end of the upper left rear stabilizer 46 is inserted through a rear stabilizer guide 47, which is attached to the upper rear of the center blade frame 18 so as to allow the stabilizer to slide through the rear stabilizer guide as the left blade frame 14 is either retracted to decrease the width of the grader-spreader bar 10, as depicted in FIG. 2, or the left blade frame 14 is extended to increase the width of the grader-spreader bar as depicted in FIG. 3.

Likewise, the outside facing end of the upper right rear stabilizer 48 is attached to the upper inside face of the right side support 33. The inside facing end of the upper right rear stabilizer 48 is inserted through a rear stabilizer guide 47, which is attached to the upper rear of the center blade frame 18 so as to allow the stabilizer to slide through the rear stabilizer guide as the right blade frame 16 is either retracted to decrease the width of the grader-spreader bar 10, as depicted in FIG. 2, or the right blade frame 16 is extended to increase the width of the grader-spreader bar as depicted in FIG. 3.

The outside facing end of the lower left rear stabilizer 50 is attached to the lower inside face of the left side support 31. The inside facing end of the lower left rear stabilizer 50 is inserted through a rear stabilizer guide 47, which is attached to the bottom rear of the center blade frame 18 so as to allow the stabilizer to slide through the rear stabilizer guide as the left blade frame 14 is either retracted to decrease the width of the grader-spreader bar 10, as depicted in FIG. 2, or the left blade frame 14 is extended to increase the width of the grader-spreader bar as depicted in FIG. 3.

Likewise, the outside facing end of the lower right rear stabilizer 52 is attached to the lower inside face of the right side support 33. The inside facing end of the lower right rear stabilizer 52 is inserted through a rear stabilizer guide 47, which is attached to the rear of the center blade frame 18 so as to allow the stabilizer to slide through the rear stabilizer guide as the right blade frame 16 is either retracted to decrease the width of the grader-spreader bar 10, as depicted in FIG. 2, or the right blade frame 16 is extended to increase the width of the grader-spreader bar as depicted in FIG. 3.

Figure 7:
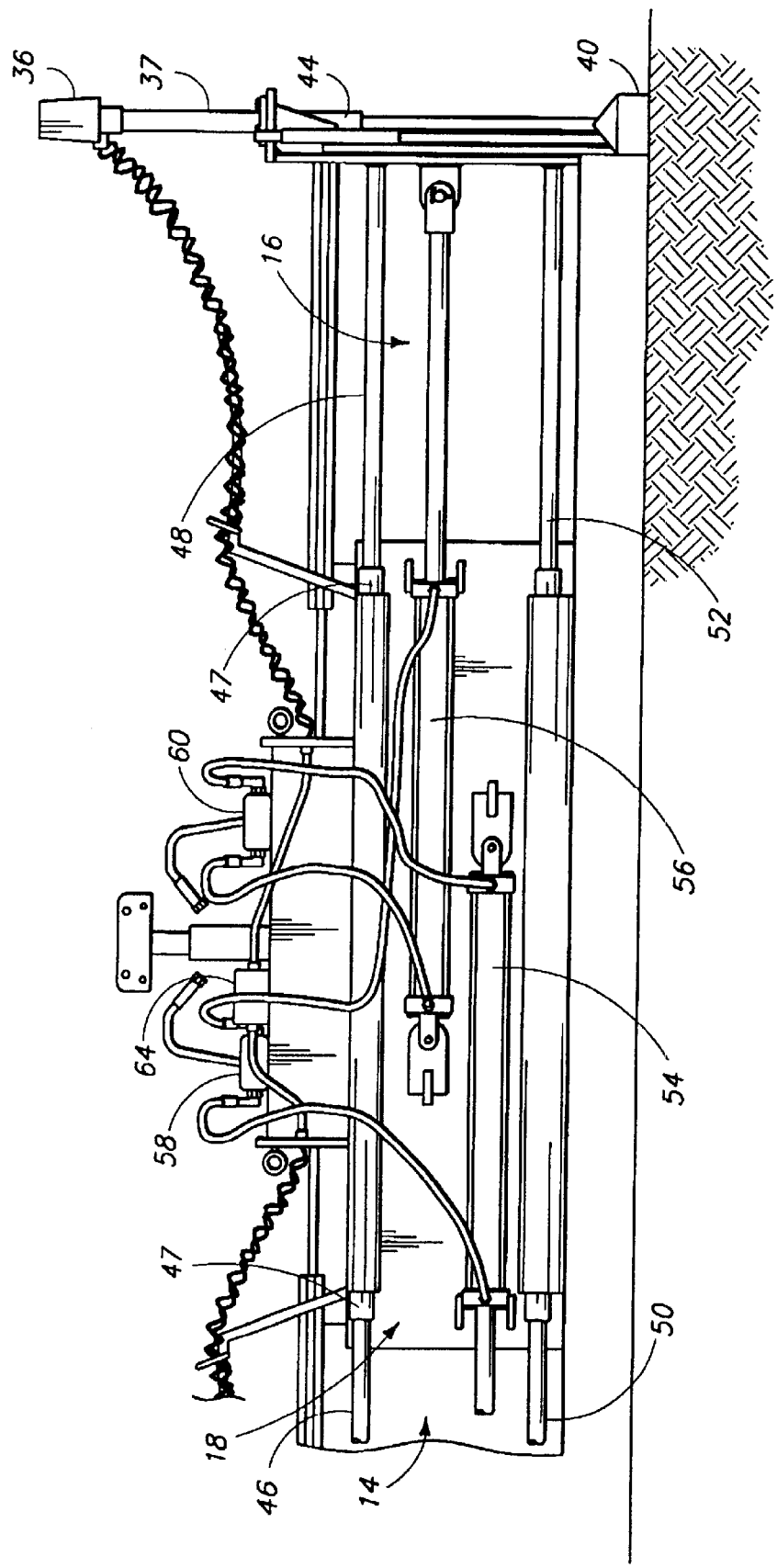
FIG. 7 shows a detailed view of the rear of the grader-spreader bar, with the ram cover removed, illustrating the positioning and mounting of the left and right actuating rams.
Figure 8:
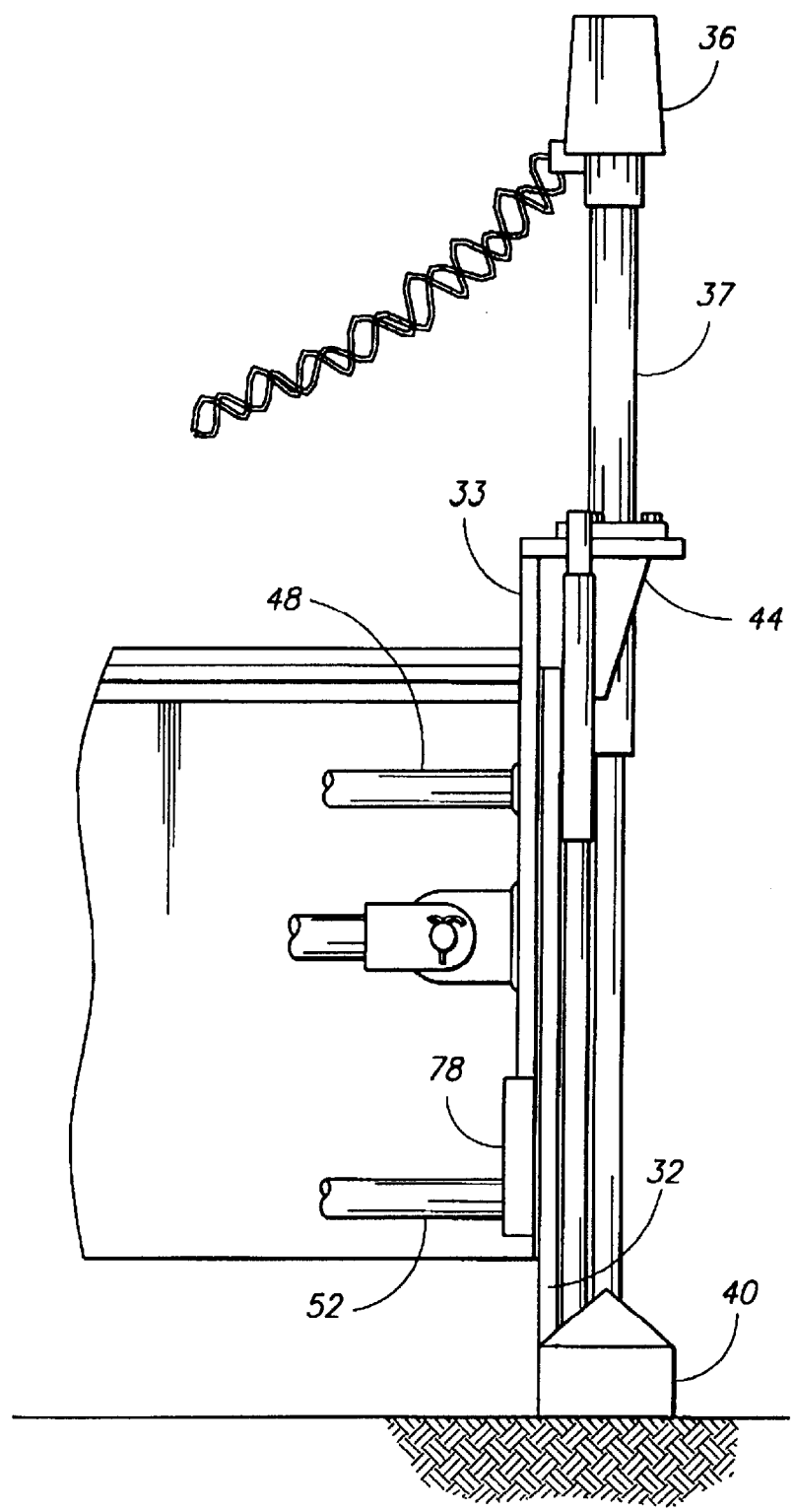
FIG. 8 shows a detailed view of an embodiment of the grader-spreader bar, showing a rear view of the right side of the invention.

The left blade frame 14 is extended or retracted by actuating means, such as the left hydraulic actuating ram 54. The cylinder portion of the left hydraulic actuating ram 54 is configured to be attached to the center blade frame 18 as depicted in FIG. 7. The piston portion of the left hydraulic actuating ram 54 is attached to the inside face of the left side support 31. As depicted in FIG. 3, hydraulic fluid is provided to the left hydraulic actuating ram 54 by hydraulic supply hoses 62. A left two-way transfer valve 58 provides hydraulic fluid to the left hydraulic actuating ram 54 so as to either extend the piston of the ram and thus extend the left blade frame 14, or to retract the piston of the ram, thus retracting the left blade frame.

Likewise, the right blade frame 16 is extended or retracted by actuating means, such as the right hydraulic actuating ram 56. The cylinder portion of the right hydraulic actuating ram 56 is configured to be attached to the center blade frame 18, as depicted in FIG. 7. The piston portion of the right hydraulic actuating ram 56 is attached to the inside face of the right side support 33 as depicted in FIG. 3. Hydraulic fluid is provided to the right hydraulic actuating ram 56 by hydraulic supply hoses 62. A right two-way transfer valve 60 provides hydraulic fluid to the right hydraulic actuating ram 56 so as to either extend the piston of the ram and thus extend the right blade frame 16, or to retract the piston of the ram, thus retracting the right blade frame.

The left hydraulic actuating ram 54 and the right hydraulic actuating ram 56 are protected by the ram cover 70. FIG. 7 illustrates the mounting of the left hydraulic actuating ram 54 and the right hydraulic actuating ram 56, with the ram cover 70 removed.

Figure 9:
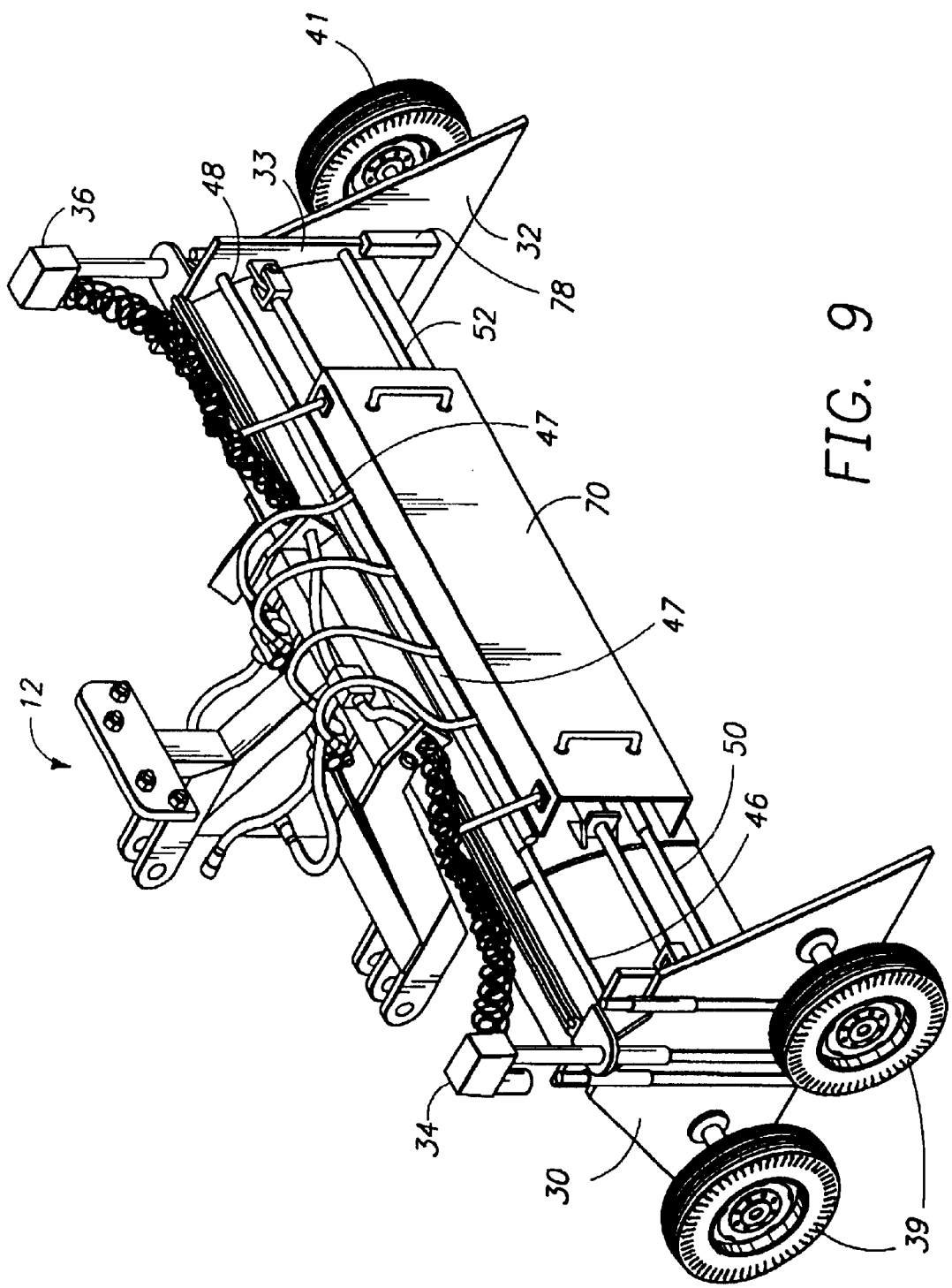
FIG. 9 shows an alternative embodiment of the grader-spreader bar in which wheels are used instead of ground engaging skids.

The grader-spreader bar is supported on the left side by the left ground engaging skid 38 and on the right side by the right ground engaging skid 40. As depicted in FIG. 9, an alternative embodiment is to replace left ground engaging skid 38 with left wheel assemblies 39 and to replace right ground engaging skid 40 with right wheel assemblies 41.

Left ground engaging skid 38 and right ground engaging skid 40 are respectively mounted to the bottoms of the left skid frame 30 and the right skid frame 32. The skid frames may be adjusted vertically by sliding up or down on the left elevation guide 42 and the right elevation guide 44, which are attached, respectively, to the left side support 31 and the right side support 33. Skid frame supports 78 are attached to the inside face of the left skid frame 30, overlapping left side support 31. Likewise, skid frame supports are attached to the inside face of the right skid frame 32, overlapping right side support 33. Raising or lowering the skid frames may be accomplished by elevating means, such as by the left elevating motor 34 and the right elevating motor 36, which respectively rotate the left screw jack 35 and the right screw jack 37. The slope meter 72 is used to accurately adjust the ground engaging skids to obtain the desired grade.

When electrical motors are used for elevating means, the invention is equipped with an electrical junction box 64, electrical motor leads 66, and electrical lead supports 68. The electrical lead supports 68 prevent the electrical leads 66 from becoming entangled in the moving components of the blade frame assembly 13.

Inasmuch as the function of the left ground engaging skid 38 and the right ground engaging skid 40 is to provide low friction surfaces to support each side of the grader-spreader bar 10 as the invention is towed, alternative devices may be substituted for the skids. For example, as depicted in FIG. 9, left wheel assemblies 39 might be attached to left skid frame 30 and right wheel assemblies 41 might be attached to right skid frame 32, replacing left ground engaging skid 38 and right ground engaging skid 40. Among other uses, the embodiment with wheels might be used for asphalt grading and paving and would allow overlapping hot asphalt without any joints. As an alternative to this embodiment, wheels might be attached directly to the ground engaging skids.

Use of the adjustable grader-spreader bar is simple to those who are familiar with the operation of tractors and towing machinery with a three-point hitch. The hydraulic supply hoses 62 from the left transfer valve 58 and the right transfer valve 60 are connected to the tractor hydraulic system, allowing the operator to control the flow of hydraulic fluid to the left actuating ram 54 and the right actuating ram 56 and thereby adjust the width of the grader-spreader bar from the seat of the tractor 11. Conventional electrical switches may be used to independently operate the left elevating motor 34 and the right elevating motor 36, thus allowing the operator to control the blade elevation and blade angle from the seat of the tractor 11.

The size, shape, location, or orientation of the various components may be changed as desired by those skilled in the art without departing from the spirit and scope of the invention. The function of one element may be performed by two, and vice versa. It is not necessary for all advantages to be present in a particular embodiment at the same time. Thus, the scope of the invention should not be limited by the specific structures disclosed.

What is claimed is:

1. A towable adjustable grader-spreader bar for use on a ground surface comprising:
   (a) a blade frame assembly, oriented transverse to the direction of travel of the grader-spreader bar, the blade frame assembly comprising a plurality of blade frames;
   (b) a plurality of blade edges, such that a blade edge is fastened to the bottom of each blade frame;
   (c) means for slideably connecting adjacent blade frames to one another so that the blade frames have an adjustable overlap with respect to one another;
   (d) actuating means for sliding the blade frames to change the total width of the adjustable grader-spreader bar;
   (e) a left ground engaging skid attached to the left side of the blade frame assembly;
   (f) a right ground engaging skid attached to the right side of the blade frame assembly; and
   (g) hitching means for connecting the grader-spreader bar to a towing vehicle.

2. The adjustable grader-spreader bar of claim 1, wherein the hitching means comprises a three-point hitch assembly attached to the front center of the blade frame assembly.

3. The adjustable grader-spreader bar of claim 1, wherein the means for slideably connecting adjacent blade frames comprises a plurality of front stabilizers and a plurality of rear stabilizers, each stabilizer connected to adjacent blade frames, so that the grader-spreader bar maintains the necessary rigidity through the entire range of width adjustments of the grader-spreader bar.

4. The adjustable grader-spreader bar of claim 1, wherein the actuating means for sliding the blade frames comprises a plurality of hydraulic actuating rams.

5. The adjustable grader-spreader bar of claim 1 further comprising elevating means for adjusting the vertical positions of the left and right ground engaging skids, so that the elevation of the cutting edges with respect to the ground surface may be adjusted on either side of the adjustable grader-spreader bar.

6. The adjustable grader-spreader bar of claim 5, wherein the elevating means for adjusting the vertical positions of the left and right ground engaging skids comprises a screw jack connected to each ground engaging skid.

7. The adjustable grader-spreader bar of claim 6, wherein an electrical motor is coupled with each screw jack so that each ground engaging skid may be automatically raised or lowered.

8. A towable adjustable grader-spreader bar for use on a ground surface comprising:
   (a) a blade frame assembly, oriented transverse to the direction of travel of the grader-spreader bar, the blade frame assembly comprising a left blade frame, a right blade frame, and a center blade frame;

(b) a left blade edge fastened to the bottom of the left blade frame, a right blade edge fastened to the bottom of the right blade frame, and a center blade edge attached to the center blade frame;

(c) means for slideably connecting the left blade frame to the center blade frame so that the overlap between the left blade frame and the center blade frame is adjustable;

(d) means for slideably connecting the right blade frame to the center blade frame so that the overlap between the right blade frame and the center blade frame is adjustable;

(e) actuating means for sliding the left blade frame to adjust the overlap between the left blade frame and the center blade frame;

(f) actuating means for sliding the right blade frame to adjust the overlap between the right blade frame and the center blade frame;

(g) a left ground engaging skid attached to the left blade frame;

(h) a right ground engaging skid attached to the right blade frame; and (i) hitching means for connecting the grader-spreader bar to a towing vehicle.

9. The adjustable grader-spreader bar of claim 8, wherein the hitching means comprises a three-point hitch assembly attached to the center blade frame.

10. The adjustable grader-spreader bar of claim 8, wherein the means for overlappingly connecting the left blade frame to the center blade frame comprises a front stabilizer, an upper rear stabilizer, and a lower rear stabilizer, each stabilizer connected to the left blade frame and the center blade frame, each stabilizer connected so that the grader-spreader bar maintains the necessary rigidity through the entire range of width adjustments of the grader-spreader bar.

11. The adjustable grader-spreader bar of claim 8, wherein the means for overlappingly connecting the right blade frame to the center blade frame comprises a front stabilizer, an upper rear stabilizer, and a lower rear stabilizer, each stabilizer connected to the right blade frame and the center blade frame, each stabilizer connected so that the grader-spreader bar maintains the necessary rigidity through the entire range of width adjustments of the grader-spreader bar.

12. The adjustable grader-spreader bar of claim 8, wherein the actuating means for sliding the left blade frame comprises a left hydraulic actuating ram.

13. The adjustable grader-spreader bar of claim 8, wherein the actuating means for sliding the right blade frame comprises a right hydraulic actuating ram.

14. The adjustable grader-spreader bar of claim 8 further comprising elevating means for adjusting the vertical positions of the left and right ground engaging skids, so that the elevation of the cutting edges with respect to the ground surface may be adjusted on either side of the adjustable grader-spreader bar.

15. The adjustable grader-spreader bar of claim 14, wherein the elevating means for adjusting the vertical positions of the left and right ground engaging skids comprises a screw jack connected to each ground engaging skid.

16. The adjustable grader-spreader bar of claim 15, wherein an electrical motor is coupled with each screw jack so that each ground engaging skid may be automatically raised or lowered.

17. A towable adjustable grader-spreader bar for use on a ground surface comprising:

(a) a blade frame assembly, oriented transverse to the direction of travel of the grader-spreader bar, the blade frame assembly comprising a left blade frame, a right blade frame, and a center blade frame; a blade frame assembly comprising a left blade frame, a center blade frame, a right blade frame;

(b) a left blade edge fastened to the bottom of the left blade frame, a right blade edge fastened to the bottom of the right blade frame, and a center blade edge attached to the center blade frame;

(c) a left front stabilizer overlappingly connecting the front of the left blade frame to the front of the center blade frame;

(d) a left upper rear stabilizer overlappingly connecting the upper rear of the left blade frame to the upper rear of the center blade frame;

(e) a left lower rear stabilizer overlappingly connecting the lower rear of the left blade frame to the lower rear of the center blade frame;

(f) a right front stabilizer overlappingly connecting the front of the right blade frame to the front of the center blade frame;

(g) a right upper rear stabilizer overlappingly connecting the upper rear of the right blade frame to the upper rear of the center blade frame;

(h) a right lower rear stabilizer overlappingly connecting the lower rear of the right blade frame to the lower rear of the center blade frame;

(i) a left hydraulic actuating ram for sliding the left blade frame;

(j) a right hydraulic actuating ram for sliding the right blade frame;

(k) a left ground engaging skid attached to the left blade frame;

(l) a right ground engaging skid attached to the right blade frame; and (m) a three-point hitch assembly attached to the front of the center blade frame for connecting the grader-spreader bar to towing means.

18. The adjustable grader-spreader bar of claim 17 further comprising a screw jack attached to each ground engaging skid for adjusting the vertical positions of the left and right ground engaging skids.

19. The adjustable grader-spreader bar of claim 18, wherein an electrical motor is coupled with each screw jack so that each ground engaging skid may be automatically raised or lowered.

20. A towable adjustable grader-spreader bar for use on a ground surface comprising:

(a) a blade frame assembly, oriented transverse to the direction of travel of the grader-spreader bar, comprising a left blade frame, a center blade frame, a right blade frame;

(b) a left blade edge fastened to the bottom of the left blade frame, a right blade edge fastened to the bottom of the right blade frame, and a center blade edge attached to the center blade frame;

(c) a left front stabilizer overlappingly connecting the front of the left blade frame to the front of the center blade frame;

(d) a left upper rear stabilizer overlappingly connecting the upper rear of the left blade frame to the upper rear of the center blade frame;

(e) a left lower rear stabilizer overlappingly connecting the lower rear of the left blade frame to the lower rear of the center blade frame;

(f) a right front stabilizer overlappingly connecting the front of the right blade frame to the front of the center blade frame;

(g) a right upper rear stabilizer overlappingly connecting the upper rear of the right blade frame to the upper rear of the center blade frame;

(h) a right lower rear stabilizer overlappingly connecting the lower rear of the right blade frame to the lower rear of the center blade frame;

(i) a left hydraulic actuating ram for sliding the left blade frame;

(j) a right hydraulic actuating ram for sliding the right blade frame;

(k) rolling means attached to the left blade frame;

(l) rolling means attached to the right blade frame; and (m) a three-point hitch assembly attached to the front of the center blade frame for connecting the grader-spreader bar to towing means.

21. The adjustable grader-spreader bar of claim 20 wherein the rolling means comprises a wheel assembly.

22. The adjustable grader-spreader bar of claim 20 further comprising a screw jack connected to the rolling means attached to the left blade frame and a screw jack connected to the rolling means attached to the right blade frame, for adjusting the vertical positions of the rolling means attached to the left blade frame and the right blade frame.

23. The adjustable grader-spreader bar of claim 22, wherein an electrical motor is coupled with each screw jack so that the vertical position of the rolling means may be automatically raised or lowered.

* * * * *